Nov. 13, 1923.
A. P. LEWIS
QUICK DETACHABLE PIPE JOINT
Filed Aug. 28, 1923
1,474,270
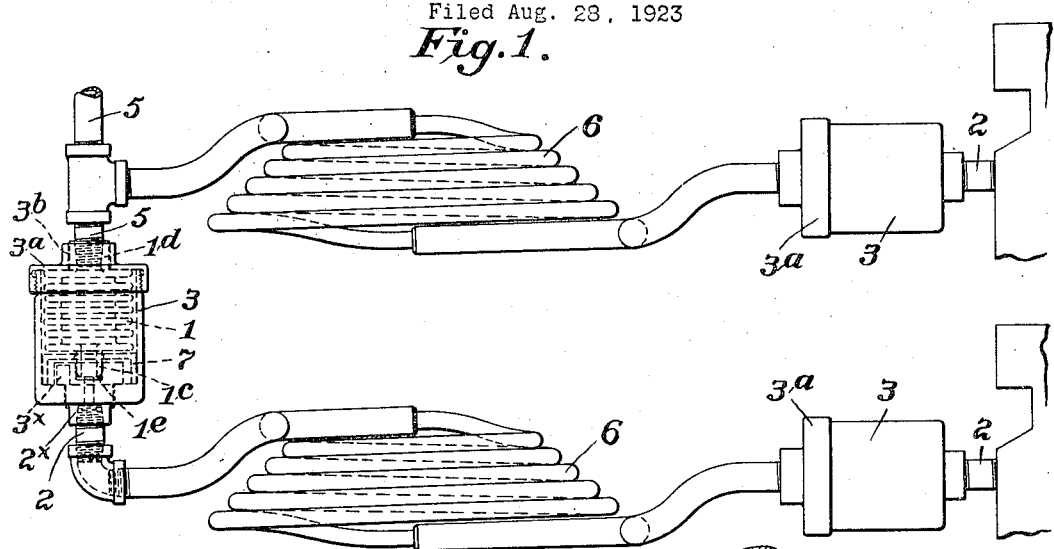
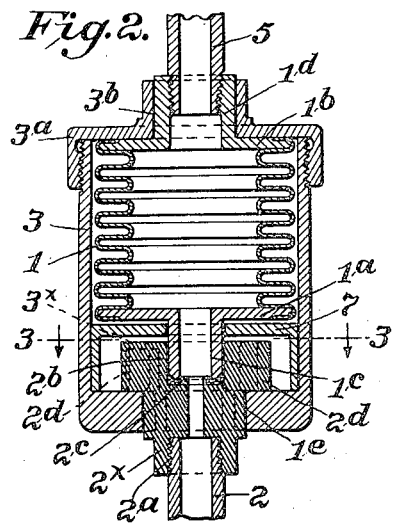
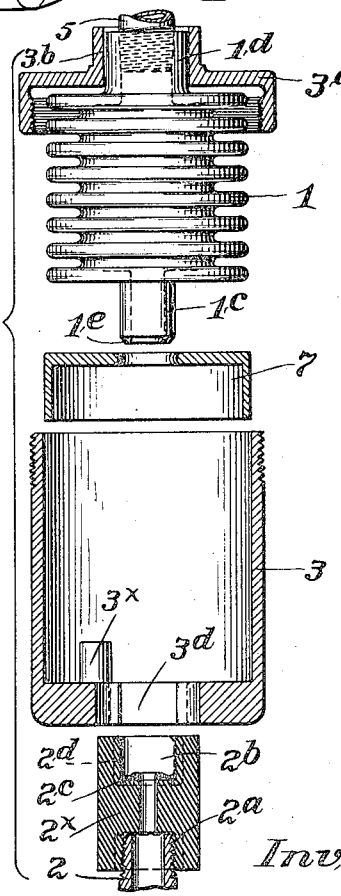
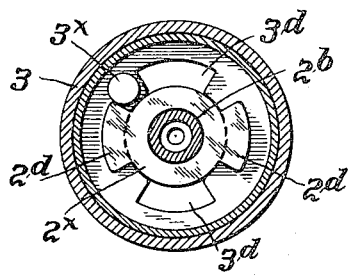
Inventor:
Arthur P. Lewis,
by [signature]
Attys.

Patented Nov. 13, 1923.

1,474,270

UNITED STATES PATENT OFFICE.

ARTHUR P. LEWIS, OF AKRON, OHIO, ASSIGNOR TO THE MILLER RUBBER COMPANY, OF AKRON, OHIO, A CORPORATION OF OHIO.

QUICK-DETACHABLE PIPE JOINT.

Application filed August 28, 1923. Serial No. 659,761.

*To all whom it may concern:*

Be it known that I, ARTHUR P. LEWIS, a citizen of the United States, and a resident of Akron, in the county of Summit and State of Ohio, have invented certain new and useful Improvements in Quick-Detachable Pipe Joints, of which the following is a specification.

My present invention relates to improvements in detachable pipe connections for handling fluids under pressure and is designed more particularly for use in connecting pressure air lines to air bags used in vulcanizing tires, though not limited to such use.

The invention aims to provide a simple, economical and durable connection which will be capable of being quickly manipulated, which will be proof against leakage, irrespective of the pressure used, and which will not be affected by the high temperature caused by the steam used for vulcanizing the tires.

The invention includes the novel features of construction and arrangement and combination of parts hereinafter described and particularly defined by the appended claims.

An embodiment of the invention is illustrated in the accompanying drawing, in which:—

Fig. 1 is a side elevation of the devices in connection with a plurality of steam vulcanizers used in vulcanizing tires on air bags.

Fig. 2 is a vertical sectional view on an enlarged scale of one of the sylphon connections.

Fig. 3 is a sectional plan view on line 3—3 of Fig. 2, and

Fig. 4 is a detail sectional view of the various parts showing their relative positions for assembling.

My invention makes use of what is known to the trade as a "sylphon," being in effect an expansible metal bellows, the sylphon being utilized to secure the fluid tight joint. Such a sylphon is indicated at 1 in the drawings, comprising a cylindrical body of thin corrugated metal such as copper, provided with rigid ends $1^a$ and $1^b$, each provided with a tubular central projection or nipple $1^c$ and $1^d$, respectively. Sleeve $1^d$ is tapped for connection to a fluid conducting pipe or supply pipe 5, while sleeve $1^c$ is provided with a seat $1^e$ preferably tapered as shown. The second fluid conducting pipe 2, which is to be detachably connected thereto, is provided with a fitting $2^x$, screw tapped at $2^a$ to fit the pipe and counterbored at $2^b$ to receive the sleeve $1^c$, the seat $1^e$ of which cooperates with a packing ring or gasket $2^c$.

Fitting $2^x$ is also provided at the opposite end with lateral extensions $2^d$ forming a non-circular head for cooperating with a corresponding non-circular opening $3^d$ in the end wall of a cylindrical casing 3 which is designed to receive and enclose the sylphon and protect it against accidental injury, the wings $2^d$ being intended to cooperate with the opening in the end wall of the casing after the manner of a bayonet joint.

The casing 3 is provided with a removable cap $3^a$ which is detachably connected therewith by suitable means, such as screw threads, as shown, the cap being provided with an opening or bore $3^b$ through which the nipple $1^d$ of the sylphon projects with a loose fit.

The distance between the inner face of the cap $3^a$ and the seat $2^c$ within the casing 3 is slightly less than the external dimensions of the sylphon 1, i. e., the distance between the outer face of the head $1^b$ and the lower end $1^e$ of the sleeve extension $1^c$ of the sylphon, so that the sylphon must be slightly compressed when the parts are assembled, thereby causing some pressure of the seated member $1^c$ on the gasket $2^c$ even in the absence of any fluid pressure.

With the parts connected as shown in Fig. 1, any fluid under pressure admitted through the supply pipe will cause expansion of the sylphon, tending to move the heads $1^a$ and $1^b$ thereof in opposite directions. As motion of the head $1^b$ is resisted by the cap $3^a$, the entire movement will be transmitted to the head $1^a$, which will cause the seat $1^e$ to be pressed against the gasket $2^c$ of the fitting 2, the fitting 2 being prevented from movement by reason of its engagement with the closed end of the cylinder. When there is no fluid pressure in the system the expansible bellows or sylphon offers very little resistance to the entry of the fitting 2, which connection may be very readily made by simply pushing the fitting up into the opening 3$^d$ with its non-circular head in alignment with the non-circular opening 3$^d$ and then giving the casing 3 a quarter turn, causing it to be locked in position, the sylphon yielding readily to permit such entry. Rotary movement of the casing relative to the head of the fitting is preferably limited by a pin or projection 3$^x$ which prevents movement through too great an angle. After such connection has been made, the admission of fluid under pressure causes expansion of the sylphon, and as the area of the sylphon head 1$^a$ is very much greater than the area of the seat 2$^c$ a moderate fluid pressure in the pipe will cause a very much greater pressure on the seat, and the pressure on the seat will always be very much greater than the pressure in the system, no matter how high the pressure system rises. Thus a connection is provided which is capable of being quickly attached and detached, but which will provide an absolutely fluid tight joint.

Sush a connection is of especially great utility and advantage in connection with steam vulcanizers, such as are used for vulcanizing tires on air bags, where it is necessary to connect all of such bags to one source of pressure, and such connections must be capable of quick attachment and detachment and of being readily removed from the vulcanizer in sections, as the molds are removed. They must also be leak-proof, as where air or other gas is used as the pressure fluid the escape of such gases into the steam chamber causes inequality in the vulcanization of the tires.

The invention is shown in the present drawings as embodied in a system adapted for such use, in which Fig. 1 shows the supply pipe arranged for connection with two molds, a portion only of which latter is shown conventionally for convenience. In this figure 5 designates the central or main supply pipe or stand pipe formed in sections, detachably connected by sylphons, and with branches leading to the air bags of the molds. When used in this way metal tubing is employed for the branch lines, as the molds are not always placed with the valve stems in the same vertical plane, and further, molds vary in diameter and the tubing must therefore have a certain amount of takeup or play. Continued bending, together with subjection to high temperatures, causes crystallization of the tubing, and to prevent this I preferably coil the tubing in a conical spiral, as shown at 6, whereby a certain degree of radial arcuate and vertical motion can take place, without subjecting the tubing to a strain which will cause a permanent set. Such tubing elements are connected to the supply pipe 5 by detachable sylphon connections as heretofore described, and also connected to the air bags of the molds by similar sylphon connections, fittings 2 being fixed to the valve stems of the air bags, while the cylinders or casings 3 have their caps 3$^a$ surrounding the ends 1$^d$ of the sylphon connected to the metal tubing as shown.

In order to prevent the sylphon unit from being jarred back and forth in the container during shipment and at other times when the non-circular head of the coupling element 2 is not in connection therewith, I provide a spacer 7 which of course is short enough to permit the expansion of the sylphon unit against the seat 2$^c$.

This seat 2$^c$ may be a plain metal seat, as I have found a metal to metal contact gives an effective seat.

I prefer, however, to use a flat packing ring 2$^c$ cut from sheet asbestos, for, as the joint is subjected to no other force or movement than one of direct compression, a safe fluid-tight non-wearing joint is secured by the use of such softer material.

I claim:

1. In a detachable pipe coupling, the combination with a pipe element, of a sylphon having one head connected thereto and its other end provided with a seating, a member connected with said pipe element located adjacent the said other end of the sylphon and connected with said pipe element to be held against lengthwise movement, said element having a non-circular opening, and a second pipe element having a non-circular head to cooperate with said opening and having a seat to cooperate with the seating of the sylphon head.

2. In a detachable pipe coupling, the combination with a pipe element, of a casing having one end connected therewith and having its other end provided with a non-circular opening, a sylphon having one head connected with said pipe element and its other head provided with a seating nipple, and a second pipe element having a non-circular head adapted to cooperate with said non-circular opening and provided with a seat to cooperate with said nipple seating.

3. In a detachable pipe coupling, the combination with a pipe element, of a sylphon having one head rigidly connected thereto and the other head movable, a retaining member adjacent the movable head and rigidly held relative to the rigid head, a second pipe element having a part to detachably engage said retaining member, said movable sylphon and said second pipe element having cooperating seats.

4. In a detachable pipe coupling, the combination with a pipe element, of a sylphon having one head rigidly connected thereto and the other head movable, and provided with a joint seat, a cylindrical casing enclosing said sylphon and having a swivel connection with said pipe element at one end and its other end provided with a non-circular opening, and a second pipe element having an end member of non-circular shape corresponding to said opening and having a joint seat coacting with the joint seat of the sylphon.

In testimony whereof, I affix my signature.

ARTHUR P. LEWIS.